(12) United States Patent
Lee et al.

(10) Patent No.: US 7,826,529 B2
(45) Date of Patent: Nov. 2, 2010

(54) H.263/MPEG VIDEO ENCODER FOR EFFICIENTLY CONTROLLING BIT RATES AND METHOD OF CONTROLLING THE SAME

(75) Inventors: Seung-Cheol Lee, Yongin-si (KR); Dae-Kyu Shin, Seoul (KR); Ji-Ho Park, Seoul (KR); Hyun-Seung Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 990 days.

(21) Appl. No.: 10/925,623

(22) Filed: Aug. 25, 2004

(65) Prior Publication Data

US 2005/0063461 A1  Mar. 24, 2005

(30) Foreign Application Priority Data

Sep. 1, 2003  (KR) ............... 10-2003-0060823

(51) Int. Cl.
*H04N 7/12* (2006.01)
(52) U.S. Cl. .................... 375/240.03; 375/240.13; 375/240.16
(58) Field of Classification Search ............. None
See application file for complete search history.

(56) References Cited

U.S. PATENT DOCUMENTS

| | | | | |
|---|---|---|---|---|
| 6,031,575 | A * | 2/2000 | Suzuki et al. | 375/240.14 |
| 6,094,455 | A * | 7/2000 | Katta | 375/240.05 |
| 6,418,166 | B1 | 7/2002 | Wu et al. | |
| 6,763,067 | B2 * | 7/2004 | Hurst | 375/240.03 |
| 6,785,331 | B1 * | 8/2004 | Jozawa et al. | 375/240.12 |
| 6,795,501 | B1 * | 9/2004 | Zhu | 375/240.03 |
| 7,277,483 | B1 * | 10/2007 | Eckart | 375/240.03 |
| 2005/0013367 | A1 * | 1/2005 | Gallant et al. | 375/240.16 |
| 2005/0078193 | A1 * | 4/2005 | Ing et al. | 348/222.1 |

FOREIGN PATENT DOCUMENTS

| | | |
|---|---|---|
| KR | 100289699 | 2/2001 |
| KR | 2001-41441 | 5/2001 |
| KR | 2001-54963 | 7/2001 |
| WO | WO 00/40031 | 7/2000 |

* cited by examiner

*Primary Examiner*—Marsha D Banks Harold
*Assistant Examiner*—Christopher Findley
(74) *Attorney, Agent, or Firm*—The Ferrell Law Firm, LLP

(57) ABSTRACT

An H.263/MPEG video encoder using DCT in a mobile communication terminal. The H.263/MPEG video encoder controls a quantization value using granularity analysis by motion estimation and efficiently controls bit rates. The H.263/MPEG video encoder performs DCT for an input image (N−1), quantizes the input image to output the input image as a video stream, decodes the quantized signal by means of inverse quantization (IQ) and inverse discrete cosine transform (IDCT), and performs motion estimation in comparison with a next input image (N). The H.263/MPEG video encoder includes a granularity analyzing section for analyzing granularity using a result of performing the motion estimation, a granularity control section for controlling a quantization value for the quantization according to an analysis result of the granularity analyzing section, and a frame rate control section for controlling a frame speed of an output of the video stream.

7 Claims, 5 Drawing Sheets

H.263/MPEG VIDEO ENCODER FOR EFFICIENTLY CONTROLLING BIT RATES AND METHOD OF CONTROLLING THE SAME

PRIORITY

This application claims priority to an application entitled "H.263/MPEG Video Encoder for Efficiently Controlling Bit Rate and Method of Controlling the Same" filed in the Korean Industrial Property Office on Sep. 1, 2003 and assigned Serial No. 2003-60823, the contents of which are hereby incorporated by reference.

BACKGROUND OF THE INVENTION

1. Field of the Invention

The present invention relates generally to multimedia data service in a mobile communication terminal, and more particularly to an H.263/MPEG video encoder using discrete cosine transform (DCT).

2. Description of the Related Art

In a mobile communication terminal capable of two-way moving image communication, a video encoder controls a bit rate to enable the terminal to perform communication at a fixed bit rate. Currently, 3GPP (third Generation Partnership Project) and domestic mobile communication providers have prepared standards recommending that H.263 and MPEG (Motion Picture Experts Group) 4 should be used as encoders for a moving image. Because the compression principle of standard video encoders is based on a discrete cosine transform (DCT) and motion prediction, a compression ratio changes according to the characteristics of moving images. However, it has been very difficult to achieve the technology for promptly controlling bit rates according to the changing compression ratios. Therefore, the specifications of the standards propose a method of controlling the compression ratio of a moving image by changing a quantization value in a quantizing step.

FIG. 1 is a block diagram illustrating an example of a conventional H.263/MPEG video encoder. As illustrated in FIG. 1, a conventional H.263/MPEG video encoder includes an original image memory 101, a first switch 103, a discrete cosine transform (DCT) section 104, a quantization (Q) section 105, an inverse quantization (IQ) section 106, an inverse discrete cosine transform (IDCT) section 107, a coupler 110, a recon memory 111, a motion estimation section 112, a motion compensation section 113, a motion compensated (Mced) memory 114, a quantization parameter (QP) memory 116, a Discrete Cosine Transformed and Quantisized (DCTQ) memory 108, and a variable length coding (VLC) section 109. The original image memory 101 receives image information by the frame and stores the received moving image. The first switch 103 transmits a first frame of the image information from the original image memory 101 directly to the DCT section 104, and transmits the other frames of the image information from the original image memory 101 indirectly to the DCT section 104 through an operation 102 with motion-compensated information, which is stored in the Mced memory 114.

The DCT section 104 performs a discrete cosine transform. The quantization (Q) section 105 quantizes the output of the DCT section 104. The inverse quantization (IQ) section 106 inverse-quantizes quantized data. The IDCT section 107 performs an inverse discrete cosine transform for the output of the inverse quantization section 106. The coupler 110 couples the motion-compensated information of a previous fame (n−1) stored in the Mced memory 114 and information of a current frame (n) decoded by the IDCT section 107. The recon memory 111 stores the decoding information for the next frame (n). The motion prediction section 112 receives the decoding information of a previous frame (n−1) stored in the recon memory 111 and an original image of a current frame (n), and then outputs a differential image and a motion vector for motion estimation. The motion compensation section 113 receives the output of the motion estimation section 112 and decoding information of a previous frame (n−1) stored in the recon memory 111 and compensates motion of the decoding information of the previous frame. The Mced memory 114 stores information of a previous frame (n−1), which has been motion-compensated.

The QP memory 116 transmits quantization values for controlling bit rates to the quantization section 105, which are different according to the input image information, one of 'Intra', 'Inter', and 'Skipped'. The DCTQ memory 108 stores data encoded by the quantization section 105. The VLC section 109 performs entropy coding to assign a lower bit rate to a more-frequently appearing value and assign a higher bit rate to a less-frequently appearing value.

In the encoder described above, when a quantization value is determined in the quantization section 105, all values less than the determined quantization value become '0'. That is, the quantization values are maintained within a predetermined range, and each of coefficients in the discrete-cosine-transformed blocks is divided by a quantization value so that a quotient is obtained. Accordingly, if the quantization value is large, the obtained quotient has a large error. As a result, image quality deteriorates but the effect of compression increases. In contrast, if the quantization value is small, the obtained quotient has a small error. As a result of this, image quality does not deteriorate but the effect of compression decreases. Accordingly, the method of determining a quantization value and a range of the coefficients to be processed as loss in the quantization is an important issue.

Also, considering the output of the video encoder illustrated in FIG. 1, in which encoded video data is output in H.263 bit streams, in order to control bit rates according to the H.263 CODEC standard, the difference between an encoded bit rate and an assigned bit rate of a predetermined bandwidth is calculated while encoding is performed by the minimum macroblock or more, and then the next quantization value increases or decreases according to the difference.

FIGS. 2A to 2C are exemplary views of encoding units for bit-rate control. More specifically, FIG. 2A illustrates encoding by the frame, in which bit-rate control for one frame is limited to one time, and FIG. 2B illustrates encoding by the GOB (Group of Blocks), in which bit-rate control for one frame is performed 9 times. For example, in the case of QCIF (Quarter Common Intermediate Format), one macroblock consists of 6 blocks, and one GOB consists of 11 macroblocks. FIG. 2C illustrates encoding by the macroblock, in which bit-rate control for one frame is performed 9×11 times.

In general, because quantization values, in the best case, can be renewed by the macroblock as illustrated in FIG. 2C, it is best that bit-rate control is performed on the macroblock unit basis. However, because of the characteristics of DCT hardware blocks influenced by these quantization values, an accompanying overhead becomes too large, and it is difficult to realize a system for this control.

Also, in the case in which bit-rate control is performed on the frame unit basis as illustrated in FIG. 2A, loss can become too large because the bit-rate control is too limited, and also lots of unnecessary calculations may occur. As a result, this method is seldom used.

Therefore, bit-rate control by the GOB, as illustrated in FIG. 2B, is generally used. In performing the bit-rate control by the GOB, motion estimation is performed for the entire of an input frame to output a motion vector and a SAD (Sum of Absolute Difference). A coding type for each of macroblocks is determined by the macroblock by means of the SAD. A differential image according to a motion vector is generated for an Inter-type macroblock by the GOB. After the amount of bits generated by the GOB is checked, a bit rate is calculated, and a quantization value is renewed.

However, even the bit-rate control by the GOB causes a large change in the amount of bits. Therefore, during a large motion or a changed scene, the amount of bits increases, and the bit-rate control of nine times often causes bit rates to exceed a predetermined bandwidth.

In addition, during a small motion or a sequence scene, the amount of bits decreases, and the predetermined bandwidth is wasted.

Further, when a previous GOB consumes lots of bits, the amount of bits assigned for the next GOB becomes lacking, and the entire image quality deteriorates. Also, because the same quantization step is applied to the entire GOB, one region for which detailed description is necessary and the other region for which detailed description is unnecessary are not distinguished from each other. For example, when a sky and caption are quantized together, the sky becomes so precise and the caption becomes too vague to read. Also, the bit-rate control by the GOB causes a problem of periodically changing image quality. For example, excess of bit amount in a previous GOB→application of large quantization to a current GOB (deterioration of image quality)→large decrease of bit amount in the current GOB→application of small quantization to the next GOB (good image quality)→excess of bit amount in the next GOB.

Finally, because occurring bit amounts change greatly, buffers of an H.324M modem chip for transmission, as well as an encoder and a decoder, must be designed in large size.

SUMMARY OF THE INVENTION

Accordingly, the present invention has been designed to solve the above-described problems occurring in the prior art, and an object of the present invention is to provide an H.263/MPEG video encoder for controlling a quantization value by using granularity analysis by motion estimation and efficiently controlling bit rates, and a method of controlling the same.

Another object of the present invention is to provide a video encoder, which utilizes a given bandwidth as much as possible and maintains an image quality as good as possible.

Also, another object of the present invention is to provide a video encoder, which minimizes coding, and transmission delays so as to satisfy real-time moving image transmission.

In order to accomplish the above and other objects, there is provided an H.263/MPEG video encoder for efficiently controlling bit rates, the H.263/MPEG video encoder performing a discrete cosine transform (DCT) for an input image (N−1), quantizing the input image to output the input image as a video stream, decoding the quantized signal using inverse quantization (IQ) and inverse discrete cosine transform (IDCT), and performing motion estimation in comparison with a next input image (N), the H.263/MPEG video encoder comprising: a granularity analyzing section for analyzing granularity using a result of performing the motion estimation; a granularity control section for controlling a quantization value for the quantization according to an analysis result of the granularity analyzing section; and a frame rate control section for controlling a frame speed of an output of the video stream.

In accordance with another aspect of the present invention, there is provided a method of controlling quantization values in an H.263/MPEG video encoder, the H.263/MPEG video encoder performing a discrete cosine transform (DCT) for an input image (N−1), quantizing the input image to output the input image as a video stream, decoding the quantized signal using inverse quantization (IQ) and inverse discrete cosine transform (IDCT), and performing motion estimation in comparison with a next input image (N), the method comprising steps of: (1) calculating the number of Intra-type macroblocks by the motion estimation, and performing quantization to control a bit rate by the macroblock when the calculated number is larger than a first predetermined value; (2) calculating the number of Intra-type macroblocks by the motion estimation, calculating a sum of absolute differences (SAD) of the Inter-type macroblocks when the calculated number is equal to or less than the first predetermined, and performing quantization to control a bit rate by the GOB (Group of blocks) when the calculated SAD is equal to or less than a second predetermined value; (3) calculating a sum of absolute values of motion vectors when the calculated SAD is larger than the second predetermined value, and performing quantization to control a bit rate by the macroblock when the calculated sum of absolute values of motion vectors is larger than a third predetermined value; and (4) calculating a sum of absolute values of motion vectors when the calculated SAD is larger than the second predetermined value, and performing quantization to control a bit rate by the GOB when the calculated sum of absolute values of motion vectors is equal to or less than the third predetermined value.

In accordance with still another aspect of the present invention, there is provided a method of controlling a frame rate in an H.263/MPEG video encoder, the H.263/MPEG video encoder performing a discrete cosine transform (DCT) for an input image (N−1), quantizing the input image to output the input image as a video stream, decoding the quantized signal by means of inverse quantization (IQ) and inverse discrete cosine transform (IDCT), and performing motion estimation in comparison with a next input image (N), the method comprising steps of: (1) confirming whether encoding of a frame of the input image has been completed, and calculating a bandwidth assigned by the frame; (2) calculating a bit amount exceeding by the frame according to the encoding by using the bandwidth assigned by the frame, the bandwidth being calculated in step (1), setting a previous margin to '0' when the exceeding bit amount is larger than '0', and setting the previous margin to the calculated bit amount exceeding by the frame when the exceeding bit amount is '0' or less; and (3) calculating an output delay time caused by the bit amount exceeding by the frame, waiting for the output delay time in addition to an output waiting time of the frame, and outputting a video stream of the input image.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
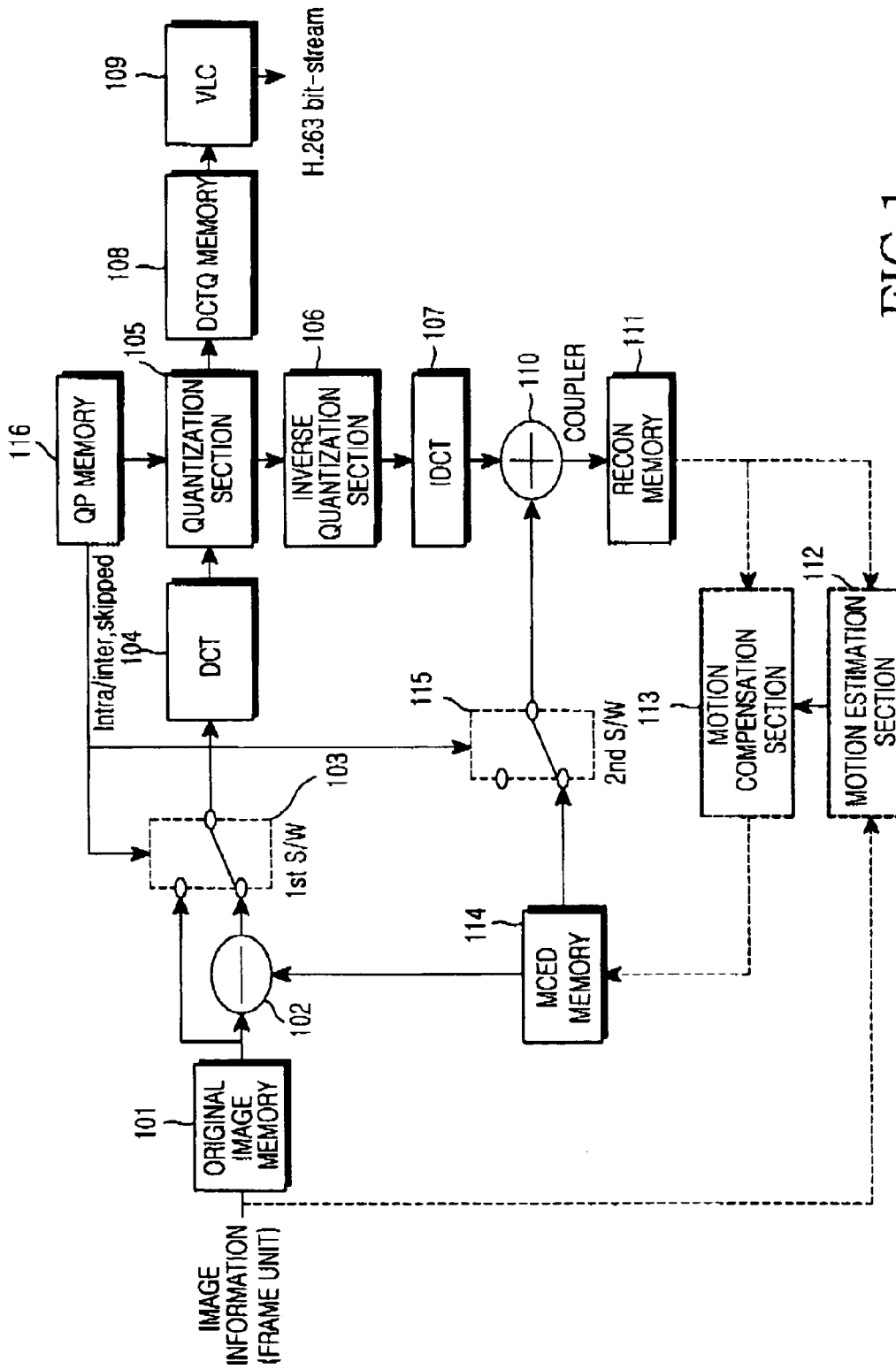
FIG. 1 is a block diagram illustrating a construction of an example of a conventional H.263/MPEG video encoder.
Figure 2C:
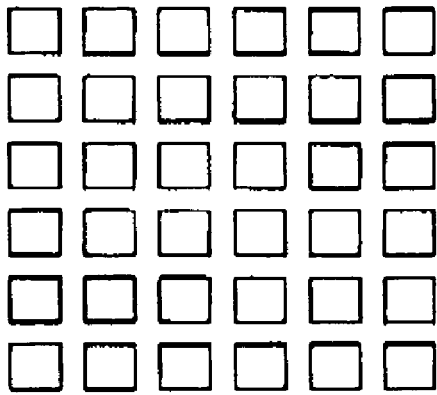
FIGS. 2A to 2C are exemplary views of encoding units for bit-rate control.
Figure 2B:
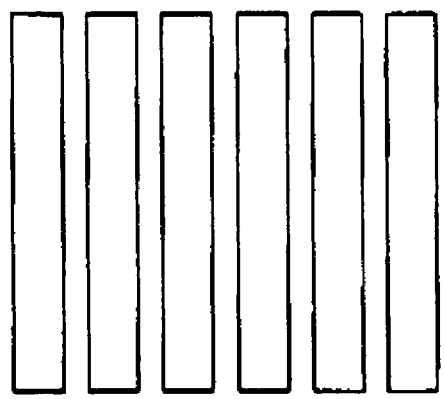
Figure 2A:
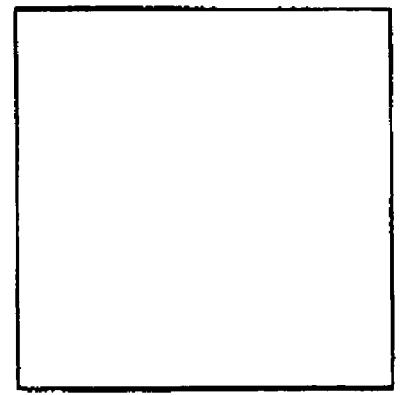

Hereinafter, an H.263/MPEG video encoder according to preferred embodiments of the present invention will be described in detail with reference to the accompanying drawings. It is to be noted that the same elements are indicated with the same reference numerals throughout the drawings. Additionally, in the following description of the present invention, a detailed description of known functions and configurations incorporated herein will be omitted when it may make the subject matter of the present invention rather unclear.

Figure 5:
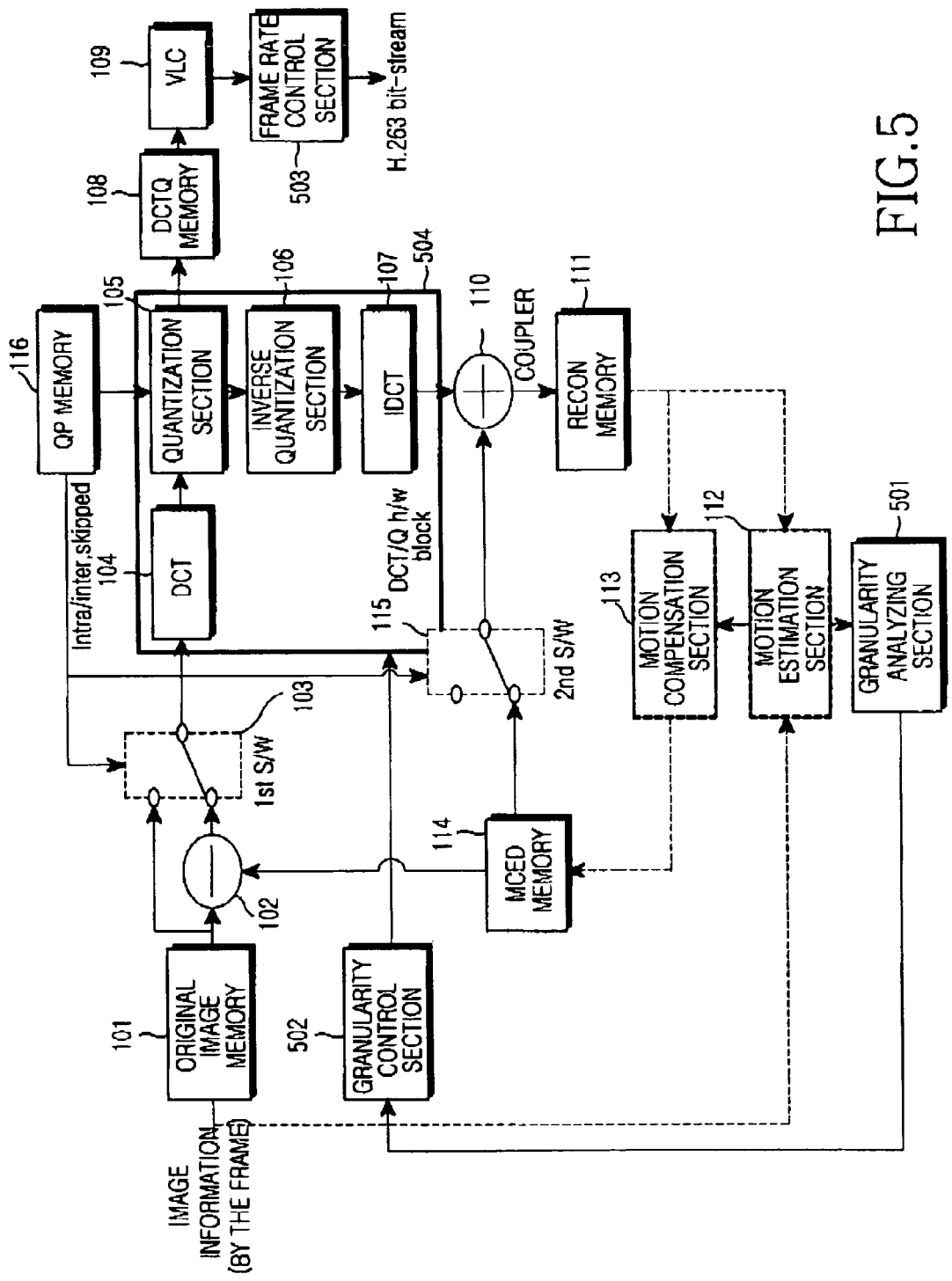
FIG. 5 is a block diagram illustrating an H.263/MPEG video encoder for efficiently controlling bit rates according to the present invention.

FIG. 5 is a block diagram illustrating an H.263/MPEG video encoder for efficiently controlling bit rates according to the present invention. As illustrated in FIG. 5, an H.263/MPEG video encoder according to the present invention includes an original image memory 101, a first switch 103, a discrete cosine transform (DCT) section 104, a quantization (Q) section 105, an inverse quantization (IQ) section 106, an inverse discrete cosine transform (IDCT) section 107, a coupler 110, a recon memory 111, a motion estimation section 112, a motion compensation section 113, an Mced memory 114, a quantization parameter (QP) memory 116, an DCTQ memory 108, and a variable length coding (VLC) section 109, which are the same elements as those illustrated in FIG. 1. In addition, the H.263/MPEG video encoder according to the present invention includes a granularity analyzing section 501, a granularity control section 502, and a frame rate control section 503.

The original image memory 101 receives image information by the frame and stores the received moving image. The first switch 103 transmits a first frame of the image information from the original image memory 101 directly to the DCT section 104, and transmits the other frames of the image information from the original image memory 101 indirectly to the DCT section 104 through an operation 102 with motion-compensated information, which is stored in the Mced memory 114. The DCT section 104 performs a discrete cosine transform. The quantization (Q) section 105 quantizes the output of the DCT section 104. The inverse quantization (IQ) section 106 inverse-quantizes quantized data. The IDCT section 107 performs an inverse discrete cosine transform for the output of the inverse quantization section 106. The coupler 110 couples the motion-compensated information of a previous fame (n−1) stored in the Mced memory 114 and information of a current frame (n) decoded by the IDCT section 107. The recon memory 111 stores the decoding information for the next frame (n).

The motion estimation section 112 receives the decoding information of a previous frame (n−1) stored in the recon memory 111 and an original image of a current frame (n), and then outputs a differential image and a motion vector for motion estimation. The motion compensation section 113 receives the output of the motion estimation section 112 and the decoding information of a previous frame (n−1) stored in the recon memory 111, and compensates motion of the decoding information of the previous frame.

The Mced memory 114 stores information of a previous frame (n−1), which has been motion-compensated. The QP memory 116 transmits quantization values for controlling bit rates to the quantization section 105, which are different according to the input image information, one of 'Intra', 'Inter', and 'Skipped'. The DCTQ memory 108 stores data encoded by the quantization section 105. The VLC section 109 performs entropy coding to assign a lower bit rate to a more-frequently appearing value and assign a higher bit rate to a less-frequently appearing value.

The granularity analyzing section 501 analyzes a quantization value using the output value of the motion estimation section 112. The granularity control section 502 controls a quantization value by the output of the granularity analyzing section 501.

In the encoder illustrated in FIG. 5, when a quantization value is determined in the quantization section 105, all values less than the determined quantization value become '0'. That is, the quantization values are maintained within a predetermined range, and each of coefficients in the discrete-cosine-transformed blocks is divided by a quantization value so that a quotient is obtained.

As indicated above, if the quantization value is large, the obtained quotient has a large error. As a result, image quality deteriorates but the effect of compression increases. In contrast, if the quantization value is small, the obtained quotient has a small error. As a result, image quality does not deteriorate but the effect of compression decreases.

In the encoder illustrated in FIG. 5 according to the present invention, a sum of absolute differences (SAD), encoding types of macroblocks determined on the basis of the SAD value, and the change of motion vector values are sensed through a motion estimation step. Then, GOBs, in which the increase of bit amount is predicted, are previously confirmed, and a system for adaptationally processing the bit-rate control according to a condition is used to efficiently process the bit-rate control of GOBs. Finally, a generation speed of a frame according to a bandwidth assigned by the frame is controlled, and is possible to generate a bit stream of an exact amount and also to efficiently maintain image quality.

More specifically, after motion estimation has been performed by the motion estimation section 112, the granularity analyzing section 501 analyzes and stores the number of Intra-type macroblocks, a value of a sum of absolute differences (SAD) of Inter-type macroblocks, and an average value of motion vectors, on the GOB unit basis.

Before the discrete cosine transform (DCT) and the quantization (Q) are performed, the granularity control section 502 determines, according to values stored in the granularity analyzing section, whether bit-rate control for each GOB is performed on the GOB unit basis or on the macroblock unit basis, and the granularity control section 502 performs a control according to a result of the determination.

According to the control process described above, as the possibility of generating lots of bit rates is higher (that is, in a case of Intra type or large motion), encoding is performed on a small unit basis, so that an encoding speed slows. This has a side effect of providing a forward function to the control of a bit amount output by the time.

After encoding one frame, the frame rate control section 503 performs a control to increase a primary-designed encoding time as much as a rate of an exceeding amount when a predetermined bit amount assigned by the frame is exceeded, and to use a remaining bit amount in the next frame when a predetermined bit amount assigned by the frame has not all been used.

Figure 3:
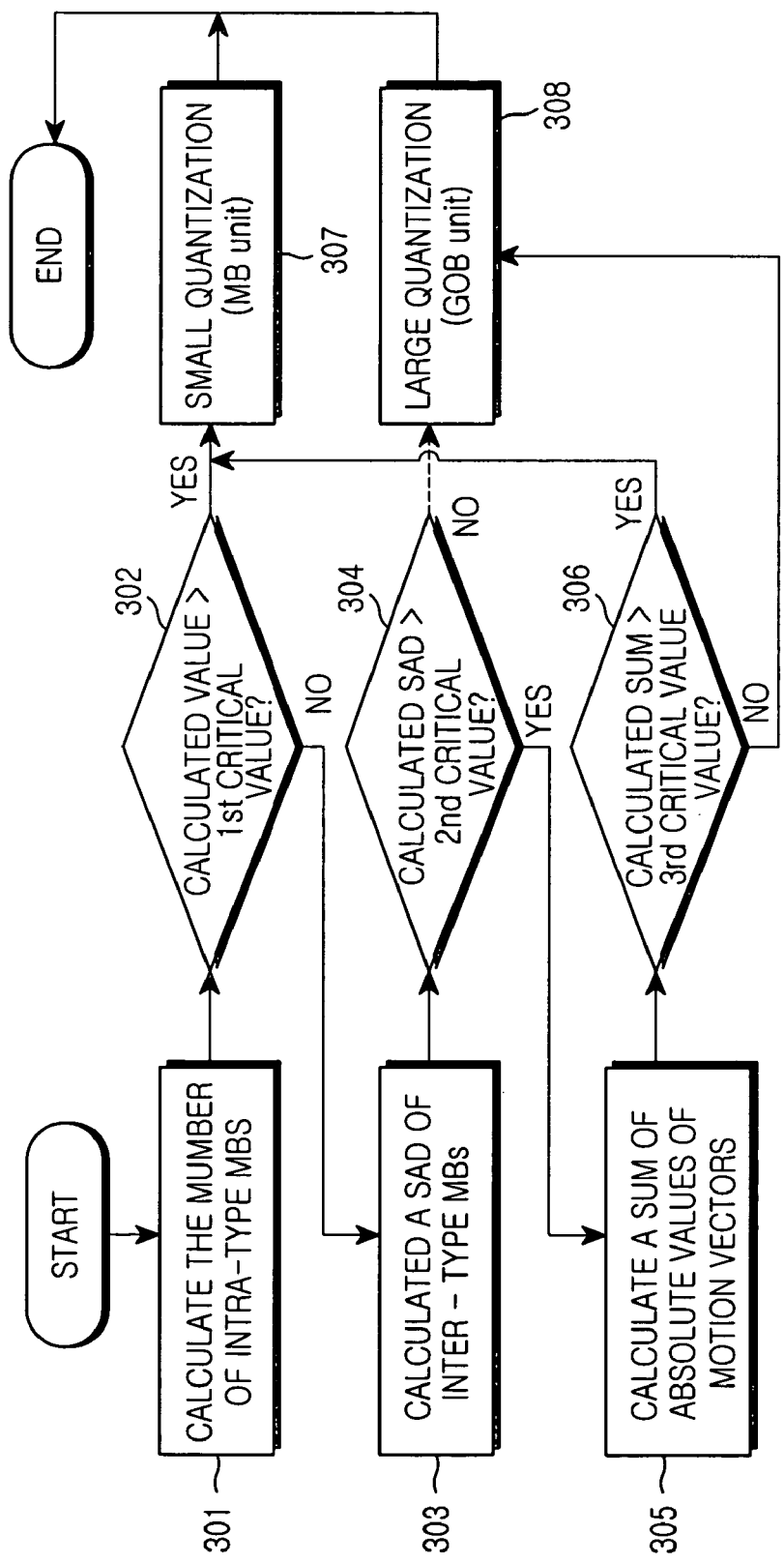
FIG. 3 is a flow chart illustrating a method for efficiently controlling bit rates according to the present invention using a granularity analyzing section and a granularity control section in an H.263/MPEG video encoder.

FIG. 3 is a flow chart illustrating a method for efficiently controlling bit rates according to the present invention, using a granularity analyzing section and a granularity control section in an H.263/MPEG video encoder. As illustrated in FIG. 3, in order to control granularity, the number of Intra-type macroblocks is calculated in step 301. In step 302, it is determined whether the calculated value is larger than a first critical value is confirmed. If the calculated value is larger than the first critical value, a small quantization to control a bit rate by the macroblock is performed in step 307. However, if the calculated value is less than the first critical value in step 302, a sum of absolute differences (SAD) of Inter-type macroblocks is calculated in step 303.

Whether the SAD of Inter-type macroblocks is larger than a second critical value is confirmed in step 304. If the SAD of Inter-type macroblocks is larger than the second critical value, a sum of absolute values of motion vectors is calculated in step 305. However, if the SAD of Inter-type macroblocks is less than the second critical value, a large quantization to control a bit rate by the GOB is performed in step 308.

If the sum of absolute values of motion vectors is larger than a third critical value in step 306, a small quantization to control a bit rate by the macroblock is performed in step 307. However, if the sum of absolute values of motion vectors is less than the third critical value, a large quantization to control a bit rate by the GOB is performed in step 308.

Figure 4:
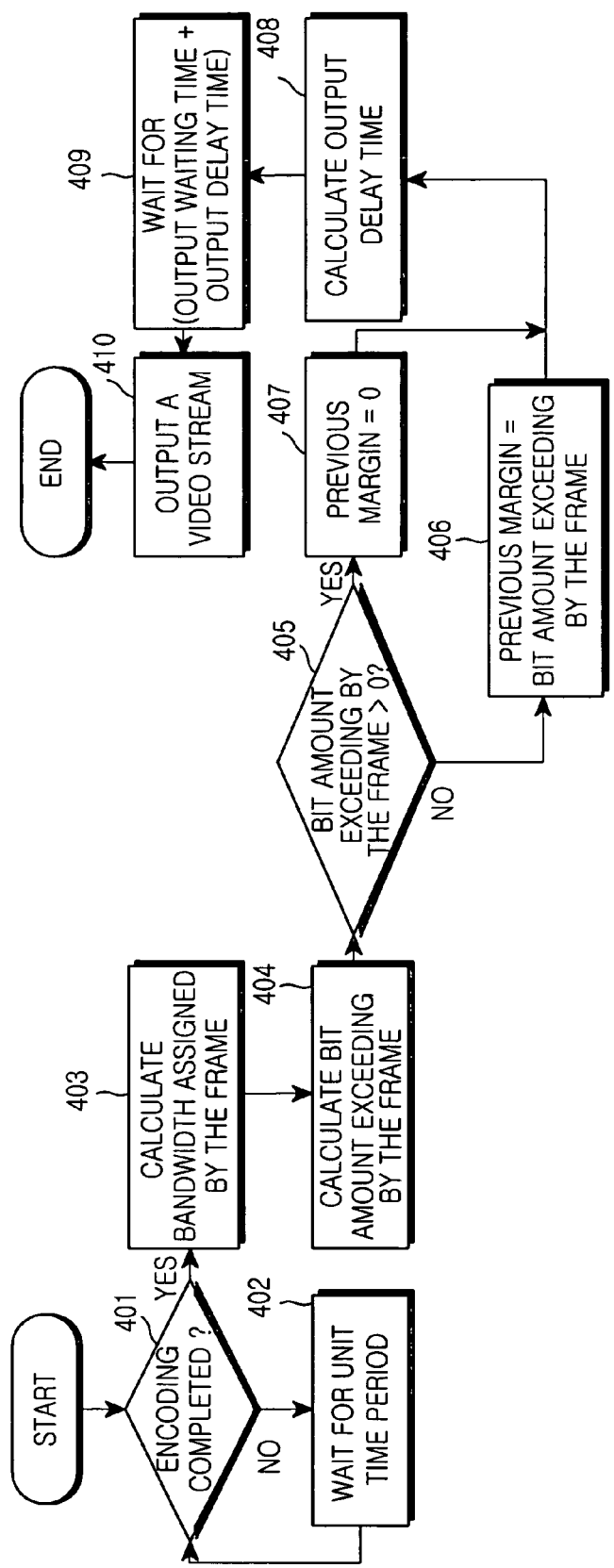
FIG. 4 is a flow chart illustrating a frame-rate control process of a frame-rate control section in an H.263/MPEG video encoder for efficiently controlling bit rates according to the present invention.

FIG. 4 is a flow chart illustrating a frame-rate control process of a frame-rate control section in an H.263/MPEG video encoder for efficiently controlling bit rates according to the present invention. As illustrated in FIG. 4, in order to control a frame rate according to the present invention, whether encoding has been completed is determined in step 401. If the encoding has not been completed, waiting is performed for a predetermined period of time in step 402. However, if the encoding has been completed, a bandwidth assigned by the frame is calculated in step 403. The bandwidth assigned by the frame is calculated as illustrated in Equation 1 below.

$$\text{Bandwidth assigned by the frame} = \text{Bandwidth for communication (bps)}/\text{Maximum frame speed per second} \times \text{Intra premium} + \text{Previous margin} \quad \text{Equation 1}$$

In Equation 1, when a macroblock is Intra type, the Intra premium is '2', and when the macroblock is Inter type, the Intra premium is $(N-1)/(N-2)$, wherein 'N' is a length between Inter and Intra and being at least '10'.

A bit amount exceeding by the frame is calculated in step 404. The bit amount exceeding by the frame is the size of an encoded frame minus the bandwidth assigned by the frame.

In step 405, it is determined whether the exceeding bit amount calculated by the frame is larger than '0'. If it is determined that the exceeding bit amount calculated by the frame is larger than '0', a previous margin is set to '0' in step 407. However, if the exceeding bit amount calculated by the frame is less than '0' in step 405, a previous margin is set to 'the exceeding bit amount by the frame' in step 406.

An output delay time is calculated in step 408. Here, the output delay time is calculated as illustrated in Equation 2 below.

$$\text{Output delay time} = \text{Assigned encoding time} \times (1/\text{maximum frame speed per second}) \times (\text{Bit amount exceeding by the frame}/\text{Bandwidth assigned by the frame}) \quad \text{Equation 2}$$

After a sum of the output delay time and an output waiting time is delayed in step 409, a video stream is output in step 410. Here, the output waiting time is calculated as illustrated in Equation 3.

$$\text{Output waiting time} = \text{Assigned encoding time} \times (1/\text{maximum frame speed per second}) - \text{Actual encoding time} \quad \text{Equation 3}$$

According to the present invention as described above, a sum of absolute differences (SAD), an encoding types of macroblocks determined on the basis of the SAD value, and the change of motion vector values are sensed through a motion estimation step. Then, GOBs, in which the increase of a bit amount is predicted, are previously confirmed, and a system for adaptationally processing the bit-rate control according to condition is used to efficiently process the bit-rate control of GOBs. Finally, a generation speed of a frame according to a bandwidth assigned by the frame is controlled, and it is possible to generate a bit stream of an exact amount and also to efficiently maintain image quality.

The present invention as described above provides an H.263/MPEG video encoder capable of efficiently controlling bit rates and a method of controlling the same, so that a given bandwidth can be best utilized and image quality can be maintained as well as possible.

Additionally, the H.263/MPEG video encoder according to the present invention minimizes coding and transmission delays, so that the encoder can satisfy real-time moving image transmission.

Further, the method according to the present invention can be realized by a program and can be stored in a recording medium (such as a CD ROM, a RAM, a floppy disk, a hard disk, an optical and magnetic disk, etc.) in a format that can be read by a computer.

While the present invention has been illustrated and described with reference to certain preferred embodiments thereof, it will be understood by those skilled in the art that various changes in form and details may be made therein without departing from the spirit and scope of the present invention as defined by the appended claims.

What is claimed is:

1. An H.263/MPEG video encoder for efficiently controlling bit rates, the H.263/MPEG video encoder performing a discrete cosine transform (DCT) for an input image (N−1), quantizing the input image to output the input image as a video stream, decoding the quantized signal utilizing inverse quantization (IQ) and inverse discrete cosine transform (IDCT), and performing motion estimation in comparison with a next input image (N), the H.263/MPEG video encoder comprising:

an analyzing section for analyzing a size of data to be quantized using a result of the motion estimation;

a control section for controlling a quantization value for the quantization according to an analysis result of the analyzing section; and a frame rate control section for controlling a frame speed of the output of the video stream;

wherein, before the discrete cosine transform (DCT) and the quantization (Q) are performed, the control section determines whether a bit-rate control for each (Group Of Blocks) GOB is performed on one of a GOB unit basis and on a macroblock unit basis, according to values stored in the analyzing section, and performs a control according to a result of the determination; and wherein, after encoding one frame, the frame rate control section increases an encoding time up to a rate of an exceeding amount when a predetermined bit amount assigned by the frame is exceeded, and the frame rate control section uses a remaining bit amount in a next frame when a predetermined bit amount assigned by the frame has not all been used.

2. The H.263/MPEG video encoder as claimed in claim 1, wherein the analyzing section analyzes and stores, by GOB (Group of blocks), a number of Intra-type macroblocks, a sum of absolute differences (SAD) of Inter-type macroblocks, and an average value of motion vectors.

3. A method of controlling quantization values in an H.263/MPEG video encoder, the H.263/MPEG video encoder performing a discrete cosine transform (DCT) for an input image (N−1), quantizing the input image to output the input image as a video stream, decoding the quantized signal utilizing inverse quantization (IQ) and inverse discrete cosine transform (IDCT), and performing motion estimation in comparison with a next input image (N), the method comprising steps of:
(1) calculating, in the video encoder, a number of Intra-type macroblocks by the motion estimation, and performing quantization, in the video encoder, to control a bit rate by a macroblock, when the calculated number is larger than a first predetermined value;
(2) calculating, in the video encoder, a number of Intra-type macroblocks by the motion estimation, calculating, in the video encoder, a sum of absolute differences (SAD) of Inter-type macroblocks when the calculated number is not greater than the first predetermined value, and performing quantization, in the video encoder, to control a bit rate by a GOB (Group of blocks) when the calculated SAD is not greater than a second predetermined value;
(3) calculating, in the video encoder, a sum of absolute values of motion vectors when the calculated SAD is larger than the second predetermined value, and performing quantization, in the video encoder, to control a bit rate by a macroblock when the calculated sum of the absolute values of the motion vectors is larger than a third predetermined value; and
(4) calculating, in the video encoder, a sum of the absolute values of the motion vectors when the calculated SAD is larger than the second predetermined value, and performing quantization, in the video encoder, to control the bit rate by the GOB when the calculated sum of the absolute values of the motion vectors is not greater than the third predetermined value.

4. A method of controlling a frame rate in an H.263/MPEG video encoder, the H.263/MPEG video encoder performing a discrete cosine transform (DCT) for an input image (N−1), quantizing the input image to output the input image as a video stream, decoding the quantized signal utilizing inverse quantization (IQ) and inverse discrete cosine transform (IDCT), and performing motion estimation in comparison with a next input image (N), the method comprising steps of:
(1) confirming, in the video encoder, whether a frame of the input image has been encoded, and calculating, in the video encoder, a bandwidth assigned by the frame;
(2) calculating, in the video encoder, an exceeding bit amount according to the encoding by using the bandwidth assigned by the frame, setting a previous margin to '0' in the video encoder when the exceeding bit amount is larger than '0', and setting the previous margin to the calculated bit amount exceeding by the frame, by the video encoder, when the exceeding bit amount is not greater than '0'; and
(3) calculating, in the video encoder an output delay time caused by the exceeding bit amount exceeding, waiting for the output delay time in addition to an output waiting time of the frame, and outputting the video stream of the input image from the video encoder;
wherein after encoding one frame, the frame speed of the output of the video stream is controlled such that the output delay time is increased as much as the bit amount exceeding by the frame when the bandwidth assigned by the frame is exceeded and a remaining bit amount in a next frame is used when the bandwidth assigned by the frame has not all been used, by adjusting the bandwidth assigned by the frame according to the set previous margin.

5. The method as claimed in claim 4, wherein the bandwidth assigned by the frame is calculated by:
Bandwidth assigned by the frame=Bandwidth for communication (bps)/Maximum frame speed per second×Intra premium+Previous margin,
wherein the Intra premium is '2' when a macroblock is Intra type, and the Intra premium is (N−1)/(N−2) when the macroblock is Inter type, in which 'N' is a length between Inter and Intra and being at least '10'.

6. The method as claimed in claim 4, wherein the output delay time is calculated by:
Output delay time=Assigned encoding time×(1/maximum frame speed per second) ×(Bit amount exceeding by the frame/Bandwidth assigned by the frame).

7. The method as claimed in claim 4, wherein the output waiting time is calculated by:
Output waiting time=Assigned encoding time×(1/maximum frame speed per second) −Actual encoding time.

* * * * *